United States Patent
Fry et al.

(10) Patent No.: US 11,070,875 B2
(45) Date of Patent: *Jul. 20, 2021

(54) METHODS AND APPARATUS TO DETERMINE A NUMBER OF PEOPLE IN AN AREA

(71) Applicant: The Nielsen Company (US), LLC, New York, NY (US)

(72) Inventors: Ranney Harrold Fry, Safety Harbor, FL (US); Mark Richard Cave, Palm Harbor, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/831,918

(22) Filed: Dec. 5, 2017

(65) Prior Publication Data
US 2018/0098118 A1 Apr. 5, 2018

Related U.S. Application Data

(63) Continuation of application No. 14/874,011, filed on Oct. 2, 2015, now Pat. No. 9,843,836, which is a
(Continued)

(51) Int. Cl.
*H04N 21/422* (2011.01)
*H04N 21/442* (2011.01)
(Continued)

(52) U.S. Cl.
CPC . *H04N 21/44218* (2013.01); *H04N 21/25883* (2013.01); *H04W 4/00* (2013.01);
(Continued)

(58) Field of Classification Search
CPC ...... H04N 21/44218; H04N 21/25883; H04W 4/029; H04W 36/08; H04W 72/0406; H04W 4/021
See application file for complete search history.

(56) References Cited

U.S. PATENT DOCUMENTS 6,625,135 B1 * 9/2003 Johnson ............... H04W 16/18
370/332
7,123,918 B1 * 10/2006 Goodman ............. H04W 24/00
455/446
(Continued)

FOREIGN PATENT DOCUMENTS

EP 2182752 5/2010
EP 2182752 A1 * 5/2010 ............ H04W 8/005
(Continued)

OTHER PUBLICATIONS

David Chambers, "Femtocell Security: Capturing phone numbers of passers-by", Feb. 9, 2010, 2 pages.
(Continued)

*Primary Examiner* — Jason K Lin
(74) *Attorney, Agent, or Firm* — Hanley, Flight & Zimmerman, LLC

(57) ABSTRACT

Methods, apparatus, systems and articles of manufacture are disclosed to determine the number of people at a location. An example apparatus includes a configuration changer to change a configuration setting of the base station to cause mobile devices to register with the base station, a registration manager to respond to registration requests received from the mobile devices after the configuration setting is changed by storing device identification information for the corresponding mobile devices, and a counter controller to identify a number of the mobile devices at a location of the base station based on the stored device identification information.

20 Claims, 9 Drawing Sheets

Related U.S. Application Data continuation of application No. 13/829,067, filed on Mar. 14, 2013, now Pat. No. 9,179,185.

(51) Int. Cl.

| | |
|---|---|
| *H04W 4/021* | (2018.01) |
| *H04W 12/08* | (2021.01) |
| *H04W 4/029* | (2018.01) |
| *H04W 4/00* | (2018.01) |
| *H04W 12/00* | (2021.01) |
| *H04W 64/00* | (2009.01) |
| *H04N 21/258* | (2011.01) |
| *H04L 12/26* | (2006.01) |
| *H04L 29/06* | (2006.01) |
| *H04W 12/61* | (2021.01) |
| *H04W 12/71* | (2021.01) |
| *H04W 24/00* | (2009.01) |
| *H04W 84/04* | (2009.01) |

(52) U.S. Cl.
CPC ........... *H04W 4/021* (2013.01); *H04W 4/029* (2018.02); *H04W 12/00* (2013.01); *H04W 12/08* (2013.01); *H04W 64/003* (2013.01); *H04L 43/0876* (2013.01); *H04L 63/302* (2013.01); *H04W 12/61* (2021.01); *H04W 12/71* (2021.01); *H04W 24/00* (2013.01); *H04W 84/045* (2013.01)

(56) References Cited

U.S. PATENT DOCUMENTS

| | | | | |
|---|---|---|---|---|
| 7,903,599 | B1* | 3/2011 | Talley | H04W 52/244 |
| | | | | 370/318 |
| 8,280,408 | B2 | 10/2012 | Ruckart et al. | |
| 8,311,011 | B2* | 11/2012 | Kim | H04W 52/287 |
| | | | | 370/331 |
| 8,387,141 | B1 | 2/2013 | Zhukov et al. | |
| 8,452,288 | B2* | 5/2013 | Cho | H04W 36/0061 |
| | | | | 370/331 |
| 8,739,197 | B1 | 5/2014 | Pecjak et al. | |
| 9,179,185 | B2* | 11/2015 | Fry | H04N 21/44218 |
| 9,338,488 | B1* | 5/2016 | Venkataraman | H04N 21/24 |
| 9,843,836 | B2* | 12/2017 | Fry | H04N 21/44218 |
| 2001/0034232 | A1 | 10/2001 | Kuwahara | |
| 2002/0198762 | A1* | 12/2002 | Donato | H04H 60/45 |
| | | | | 725/24 |
| 2004/0034570 | A1 | 2/2004 | Davis | |
| 2004/0128202 | A1* | 7/2004 | Baum | G06Q 10/06 |
| | | | | 705/22 |
| 2005/0239482 | A1* | 10/2005 | Fan | H04W 48/04 |
| | | | | 455/456.4 |
| 2007/0066329 | A1* | 3/2007 | Laroia | H04B 7/2678 |
| | | | | 455/502 |
| 2007/0259684 | A1* | 11/2007 | Shimahara | H04B 1/3805 |
| | | | | 455/550.1 |
| 2008/0059390 | A1* | 3/2008 | Cox | G06Q 30/02 |
| | | | | 706/12 |
| 2008/0062940 | A1 | 3/2008 | Othmer et al. | |
| 2009/0106362 | A1 | 4/2009 | Kuhlke et al. | |
| 2009/0323634 | A1* | 12/2009 | Kim | H04W 52/287 |
| | | | | 370/331 |
| 2010/0130212 | A1 | 5/2010 | So et al. | |
| 2010/0275225 | A1 | 10/2010 | Nielsen et al. | |
| 2011/0014916 | A1* | 1/2011 | Cho | H04W 36/0061 |
| | | | | 455/437 |
| 2011/0040628 | A1 | 2/2011 | Kido | |
| 2011/0077043 | A1 | 3/2011 | Aoyagi et al. | |
| 2011/0173074 | A1 | 7/2011 | Shinozaki | |
| 2011/0207440 | A1 | 8/2011 | Ruuspakka et al. | |
| 2011/0306324 | A1 | 12/2011 | Jang et al. | |
| 2011/0312338 | A1 | 12/2011 | Park et al. | |
| 2012/0051295 | A1 | 3/2012 | Ergen | |
| 2012/0072940 | A1 | 3/2012 | Fuhrer | |
| 2012/0135684 | A1 | 5/2012 | Shrum, Jr. et al. | |
| 2012/0185299 | A1* | 7/2012 | Kobayashi | G06Q 10/06 |
| | | | | 705/7.34 |
| 2012/0213410 | A1 | 8/2012 | Ramaswamy et al. | |
| 2012/0253925 | A1 | 10/2012 | Chen et al. | |
| 2012/0272319 | A1 | 10/2012 | Shi et al. | |
| 2012/0289246 | A1 | 11/2012 | Huber et al. | |
| 2013/0041758 | A1 | 2/2013 | Mikan et al. | |
| 2013/0041759 | A1 | 2/2013 | Mikan et al. | |
| 2013/0137451 | A1 | 5/2013 | Meredith et al. | |
| 2013/0344844 | A1* | 12/2013 | Goldfarb | H04L 63/1408 |
| | | | | 455/411 |
| 2014/0236737 | A1 | 8/2014 | Rowe | |
| 2014/0282641 | A1 | 9/2014 | Fry et al. | |
| 2015/0150035 | A1* | 5/2015 | Chizi | H04N 21/44204 |
| | | | | 725/14 |
| 2015/0282033 | A1* | 10/2015 | Lunden | H04W 36/0055 |
| | | | | 455/436 |
| 2015/0334523 | A1* | 11/2015 | Lappetelainen | H04W 4/80 |
| | | | | 455/456.1 |
| 2017/0339521 | A1* | 11/2017 | Colonna | H04W 4/029 |
| 2017/0353830 | A1* | 12/2017 | Colonna | H04W 4/029 |
| 2017/0353831 | A1* | 12/2017 | Colonna | H04W 4/029 |
| 2017/0359686 | A1* | 12/2017 | Colonna | H04W 4/029 |
| 2018/0233032 | A1* | 8/2018 | Colonna | G08G 1/012 |

FOREIGN PATENT DOCUMENTS

| | | | | |
|---|---|---|---|---|
| EP | 2182752 B1 * | 6/2014 | ............ | H04W 8/005 |
| WO | 2008055865 | 5/2008 | | |
| WO | WO-2008055865 A2 * | 5/2008 | ............ | H04W 24/00 |

OTHER PUBLICATIONS

Patent Cooperation Treaty, "International Search Report," issued in connection with Application No. PCT/US0214/023512, dated Jul. 22, 2014, 5 pages.

Patent Cooperation Treaty, "Written Opnion," issued in connection with Application No. PCT/US0214/023512, dated Jul. 22, 2014, 4 pages.

United States Patent and Trademark Office, "Non-Final Office Action," issued in connection with U.S. Appl. No. 13/829,067, dated Feb. 26, 2014, 23 pages.

United States Patent and Trademark Office, "Final Office Action," issued in connection with U.S. Appl. No. 13/829,067, dated Sep. 8, 2014, 15 pages.

United States Patent and Trademark Office, "Notice of Allowance," issued in connection with U.S. Appl. No. 13/829,067, dated May 12, 2015, 25 pages.

Patent Cooperation Treaty, "International Preliminary Report on Patentability," issued in connection with Application No. PCT/US0214/023512, dated Sep. 24, 2015, 6 pages.

United States Patent and Trademark Office, "Notice of Allowance," issued in connection with U.S. Appl. No. 13/829,067, dated Sep. 28, 2015, 22 pages.

United States Patent and Trademark Office, "Final Office Action," issued in connection with U.S. Appl. No. 14/874,011, dated Dec. 16, 2016, 17 pages.

United States Patent and Trademark Office, "Non-final Office Action," issued in connection with U.S. Appl. No. 14/874,011, dated Jun. 10, 2016, 16 pages.

United States Patent and Trademark Office, "Notice of Allowance," issued in connection with U.S. Appl. No. 14/874,011, dated Aug. 4, 2017, 7 pages.

Patent Cooperation Treaty, "International Preliminary Report on Patentability," issued in connection with Application No. PCT/US2014/023512, dated Sep. 15, 2015, 5 pages.

Patent Cooperation Treaty, "Written Opinion," issued in connection with Application No. PCT/US2014/023512, dated Jul. 22, 2014, 4 pages.

(56) References Cited

OTHER PUBLICATIONS

Patent Cooperation Treaty, "International Search Report," issued in connection with Application No. PCT/US2014/023512, dated Jul. 22, 2014, 3 pages.

* cited by examiner

METHODS AND APPARATUS TO DETERMINE A NUMBER OF PEOPLE IN AN AREA

RELATED APPLICATIONS

This application arises from a continuation of U.S. Non-Provisional patent application Ser. No. 14/874,011, filed Oct. 2, 2015, entitled "Methods and Apparatus to Determine a Number of People in an Area," which is a continuation of U.S. Non-Provisional patent application Ser. No. 13/829,067, filed Mar. 14, 2013, entitled "Methods and Apparatus to Determine a Number of People in an Area". U.S. Non-Provisional patent application Ser. No. 14/874,011 and U.S. Non-Provisional patent application Ser. No. 13/829,067 are hereby incorporated by reference in their entirety. Priority to U.S. Non-Provisional patent application Ser. No. 14/874,011 and U.S. Non-Provisional patent application Ser. No. 13/829,067 is claimed.

FIELD OF THE DISCLOSURE

This disclosure relates generally to wireless technology, and, more particularly, to monitoring a number of people in an area using wireless technology.

BACKGROUND

Wireless technology enables an individual to communicate with others and/or a network using a mobile device (e.g., a mobile phone (e.g., a cell phone or smartphone), personal digital assistant, a tablet computer (e.g., an iPad®), a laptop computer, etc.). A mobile device establishes communication with a network by registering with a base station or access point.

For cellular communication, a base station may be an access point (e.g., a standard mobile base station, a microcell, a picocell, a femtocell, etc.) that is accessible using cellular communication technology (e.g., global system for mobile communication (GSM), code division multiple access (CDMA), etc.). For other wireless communication, such as Wi-Fi, the base station may be a wireless router, hotspot access point, etc.

DETAILED DESCRIPTION

Figure 1:
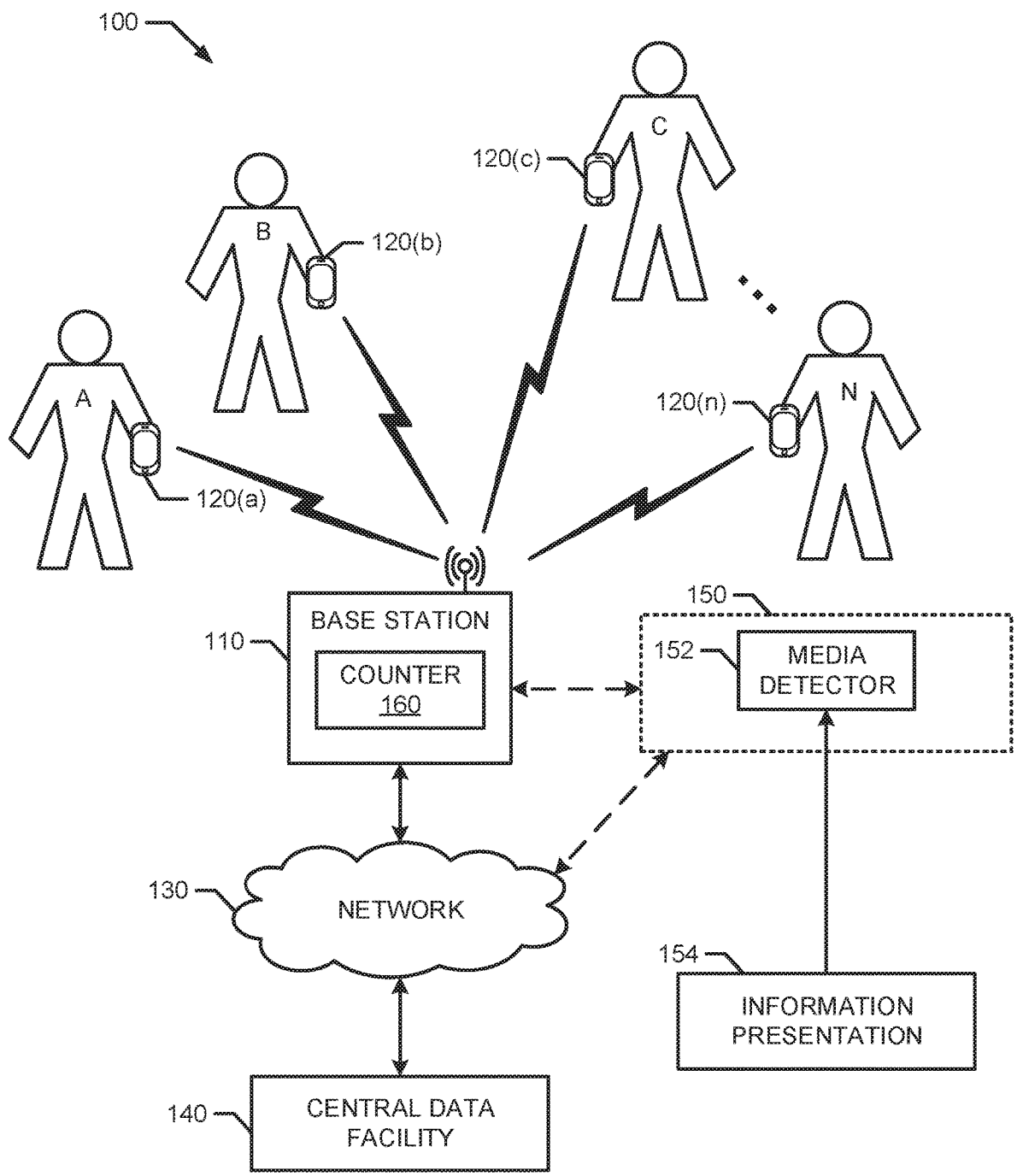
FIG. 1 is an illustration of an example environment including an example base station disclosed herein.

Example methods and apparatus disclosed herein determine a number of people in an area based on a number of mobile devices communicating or attempting to communicate with a base station within or near the area. Example methods include logging, via a processor, identification information for one or more mobile device(s) corresponding to one or more received request(s) to register with a base station and determining a number of mobile devices located in an area corresponding to the base station during a particular period of time based on the tracked periods of time. In some examples, the identities of the mobile devices are logged and timestsamped. Such data may be used as people meter data to facilitate audience measurement by aligning the people meter data with media exposure data for an information presentation device in the vicinity of the base station. This approach works particularly well when the base station is geographically limited. For example, this approach works well when the base station is a femtocell.

In some examples disclosed herein, a base station is an operable or active base station that provides communication services to a subscriber network. In other examples, a base station is a counterfeit base station that "acts" like an active base station by broadcasting signals within an appropriate frequency range, such as a cellular frequency range licensed to one or more mobile service providers (e.g., Verizon, AT&T, T-Mobile, Sprint, etc.), but does not actually provide communication services. In some such examples, the base station or counterfeit base station monitors registration requests from the mobile devices to determine the number of mobile devices in a location. In such examples, the mobile devices automatically attempt to register with the base station or counterfeit base station in order to gain access to a network.

By logging attempts to register with a base station or counterfeit base station, example methods and apparatus disclosed herein are able to determine a number of people at a location near the base station or counterfeit base station during corresponding period(s) of time. In some examples, an identifier of the mobile device is logged in connection with the request to register, and such requests to register are timestamped. By detecting repeated requests to register, examples disclosed herein can record a duration of time a mobile device is in the vicinity of the base station.

As noted above, example methods and apparatus disclosed herein may be implemented for use with an audience measurement system. In audience measurement systems, detection of person identifying information identifying persons at a location where a media presentation is occurring is used to determine ratings and/or other audience measurements. The person identification data can be mapped, aligned, and/or correlated with media identifying information corresponding to detected media at the same location to provide exposure data for that media (e.g., to determine the audience size and/or demographic composition from the audience). For example, an audience measurement entity (e.g., The Nielsen Company (US), LLC) can calculate ratings for a first piece of media (e.g., a television program) based on person identifying information and media identifying information data collected from a plurality of panelist sites. The person identifying information is used in such examples to look up the demographics of the persons with the identifying information. Such persons identified have previously registered as panelists by providing their demographics, consenting to having their media exposure tracked, and receiving a panelist user name or identifier. For example, in each panelist site wherein the first piece of media is detected in the monitored environment at a first time, media identifying information for the first piece of media is associated with person identifying information (e.g., representing a number of individuals at the location, a panelist identifier such as a name or other alphanumeric identifier, demographics, etc.) collected for persons present in the environment at the first time. The results from multiple panelist sites are combined and/or analyzed to provide ratings representative of exposure of a larger population of interest.

Example methods and apparatus disclosed herein may be used to count a number of audience members exposed to media at a location proximate the base station or counterfeit base station. In particular, by identifying a number of mobile devices in communication with the base station or counterfeit base station at a particular period of time and identifying a media presentation during the same period of time, an audience measurement entity is able to determine exposure metrics for the media presentation at the corresponding location.

Mobile technology has become so popular that it is rare for an adult individual to not own a mobile device and/or carry a mobile device on his or her person. Moreover, even many minors (e.g., teenagers and younger) often carry their own cellular phone and/or other wireless device (e.g., an iPod™ or other MP3 player). Accordingly, by identifying a number of mobile devices in an area, an assumption can be made that the same or approximately the same number of people are located in the same area. In other words, the number of mobile devices registering with or attempting to register with a base station may serve as a proxy for the number of people in the vicinity of the base station. Examples disclosed herein recognize that although a number of mobile devices may be detected in an area, it does not necessarily mean that an exactly equivalent number of people is located in the same area. For example, children may not carry mobile devices, and therefore may not be recognized as present. As another example, some individuals carry two or more mobile devices, and therefore, may be recognized as two individuals. Therefore, the detected number of mobile devices in communication with (and/or who have registered with or attempted to register with) a base station or counterfeit base station may be adjusted using a probability of the accuracy of the number of individuals. For example, if an audience of particular media (e.g., a children's program) is expected to include many children, the probability of accuracy may be different (e.g., lower) than for an audience of second media (e.g., Downtown Abbey) expected to include primarily adults. Accordingly, demographics, location, etc. for an expected audience may be used to determine the probability of accuracy. The probability of accuracy may provide a multiplier to adjust the audience count (up or down) to improve the accuracy of the people counter.

As disclosed herein, a user may be associated with a mobile device by carrying the mobile device on his or her person and/or by being registered to the mobile device. Example mobile devices may automatically (e.g., cellular phones) and/or manually (e.g., Wi-Fi devices that request authorization) attempt to register and/or communicate with a base station and/or counterfeit base station. A mobile device that automatically communicates with a base station and/or counterfeit base station requests communication with the base station and/or counterfeit base station without user interaction. A mobile device that manually establishes communication with the base station and/or counterfeit base station requests user authorization to communicate with the base station and/or communicates with the base station and/or counterfeit base station upon a user request.

FIG. 1 is an illustration of an example environment 100 including an example base station and/or counterfeit base station 110. In the illustrated example of FIG. 1, the example base station and/or counterfeit base station 110 communicates with multiple mobile device(s) 120(a), 120(b), 120(c), . . . , 120(n) (generally or collectively referred to herein as "mobile device(s) 120"), wherein (n) represents the number of mobile devices 120 in communication with the base station and/or counterfeit base station 110 at a given time. The example base station 110 may facilitate communication between the mobile device(s) 120 and a network 130 (e.g., a local area network (LAN), a wide area network (WAN), the Internet, and/or a cellular phone system). Alternatively, the base station 110 may be an example counterfeit base station 110 which does not actively connect the mobile device(s) to a network. The example network 130 of FIG. 1 facilitates communication between the base station 110 and a central data facility 140. The network 130 may be implemented by one or more networks. In some examples, the example base station 110 facilitates communication between a media identification system 150 and the network 130 and/or the central data facility 140. The example media identification system 150 of the illustrated example includes a media detector 152 (e.g., a meter) that monitors media output by a media presentation device 154. The media presentation device 154 may be one or more of a television, a radio, a computer, a billboard, etc.

In the illustrated example of FIG. 1, mobile device users A, B, C, . . . , N are associated with mobile device(s) 120(a), 120(b), 120(c), 120(n), respectively, where (N) is equivalent to a number of users/mobile device(s) 120 in communication with the base station and/or counterfeit base station 110. The example mobile device(s) 120 may be a mobile phone (e.g., a cell phone, smartphone, etc.), mp3 player (e.g., an iPod™), a personal digital assistant (PDA), a tablet computer (e.g., an iPad™), a laptop computer, etc.

The example base station and/or counterfeit base station 110 of FIG. 1 includes an example counter 160. The example counter 160 tracks a number (n) of mobile device(s) 120 in communication with the base station 110. The base station and/or counterfeit base station 110 logs mobile device identification information such as an identifier of the mobile device(s) 120 (e.g., an IMEI number), timestamp(s) corresponding to communications with the mobile device(s) 120, and/or signal metrics (e.g., signal strength, signal type, signal direction, etc.). The mobile device identification information is logged by the example counter 160 of the base station 110 of FIG. 1. In some examples, the counter 160 provides the logged mobile device identification information to the central data facility 140 for further processing (e.g., determining a number of people located at a location of the base station 110 at a particular time, determining the demographic of such persons, etc.), storage, etc.

In examples in which the media identification system 150 is implemented with the base station and/or counterfeit base station 110, audience exposure metrics may be developed for a media presentation output by the media presentation device 154 by identifying the media and determining the number (N) of users in the environment 100 and/or the identification of such users. The number (N) of users can be determined based on the number (n) of mobile device(s) 120 in communication with the base station and/or counterfeit base station 110 or that were in communication with the base station and/or counterfeit base station 110 during the time period the presentation device 154 presented the media (such an example is described in further detail below in connection with FIG. 7 and accompanying disclosure). The demographics of such users can be determined by using device identification information collected by the base station and/or counterfeit base station 110 during the request messages.

The example media detector 152 of FIG. 1 detects presentation(s) of media (e.g., television programming, radio programming, online streaming, billboard advertisements, Internet media such as web sites, television advertisements, radio advertisements, Internet radio, etc.) in the environment 100 and/or collects identification information associated with the detected presentation(s). In some examples, the media detector 152 of the illustrated example, which may be in wired and/or wireless communication with the media presentation device 154, identifies a presentation time and a source identification (e.g., a tuned channel) of the media. The presentation time and the source identification data may be utilized to identify the corresponding media by, for example, cross-referencing a program guide configured, for example, as a look up table. In such instances, the source identification data may be, for example, the identity of a channel (e.g., obtained by monitoring a tuner of the presentation device 154 or another device (e.g., a set-top box (STB)) associated with the presentation device 154) currently being presented on the information presentation device 154.

In some examples, the example media detector 152 identifies the presentation by detecting codes (e.g., watermarks, etc.) embedded with or otherwise conveyed (e.g., broadcast) with media being presented via the presentation device 154. As used herein, a code is an identifier that is transmitted with the media for the purpose of identifying and/or for tuning to (e.g., via a packet identifier (PID) header and/or other data used to tune or select packets in a multiplexed stream of packets) the corresponding media. Codes may be carried in the audio, in the video, in metadata, in a vertical blanking interval, in a program guide, in content data, and/or in any other portion of the media and/or the signal carrying the media. In the illustrated example, the media detector 152 extracts the codes from the media. In some examples, the media detector 152 may collect samples of the media and export the samples to a remote site for detection of the code(s).

Additionally or alternatively, the media detector 152 can collect a signature representative of a portion of the media. As used herein, a signature is a representation of some characteristic of one or more signal(s) carrying or representing one or more aspects of the media (e.g., a frequency spectrum of an audio signal). Signatures may be thought of as fingerprints of the respective media. Collected signature(s) can be compared against a collection of reference signatures of known media to identify the tuned media. In some examples, the signature(s) are generated by the media detector 152. Additionally or alternatively, the media detector 152 may collect samples of the media and export the samples to a remote site for generation of the signature(s). Collecting codes and/or signatures for the purposes of audience measurement have long been known. Such a system was first disclosed in U.S. Pat. No. 5,481,294, which is hereby incorporated by reference.

In some examples, the base station 110 generates a list indicating the number of mobile devices 120 that were in communication with the base station 110 during a period of time (e.g., specific hour, half-hour, quarter-hour, minute, etc.). For example, the list may be generated chronologically indicating the number (n) of mobile devices 120 that were in communication with the base station 110 during the time period in question. In some examples, the media detector 152 generates a list of programs identified at a particular location. For example, the list may be generated chronologically indicating the media (e.g., content and/or advertisements) detected during the time period in question. By identifying media that was presented at a particular time, an audience measurement entity may cross-reference the time to the list generated by the base station and/or counterfeit base station 110 to identify the number (n) of mobile devices 120 that were in communication with the base station 110 at that time, and thus identify an approximate (or exact) number of people (N) exposed to the detected media. In examples where the base station and/or the counterfeit base station 110 record the identity of the mobile device(s), the audience measurement entity can match the media exposure to panelists associated with one or more of the devices (n) and, thus, can develop metrics reflecting exposure of specific demographic population(s) for the media.

As an example, in FIG. 1, assume the media identification system 150 is located at a restaurant that displays the Super Bowl on a television, implementing the media presentation device 154. The restaurant of this example includes a femtocell, which implements the base station 110, to enable mobile cellular phone(s) 120 to connect to a subscriber network 130. The example femtocell 110 of this example incorporates the counter 160 to track a number of cell phones 120 in communication or attempting to communicate with the femtocell 110. Assume that the media detector 152 identifies that the Super Bowl was presented on the television from 5:30 PM-9:30 PM and that the counter capabilities of the femtocell 110 identify that 100 cell phones 120 (i.e., n=100) connected with the femtocell 110 from 5:30-9:30 PM. Accordingly, an audience measurement entity, upon receipt of the above information, determines that 100 people (or approximately 100 people) were exposed to the Super Bowl at the restaurant between 5:30 PM and 9:30 PM. If any of these people are panelists of the audience measurement entity, the identification of the cellular phones of the panelists may be used to develop more granular data (e.g., three Hispanic males between ages 30 and 35 were exposed to the Super Bowl (and, perhaps more importantly, the advertisements presented with the Super Bowl) between 6:30 PM an 7:00 PM).

Figure 2:
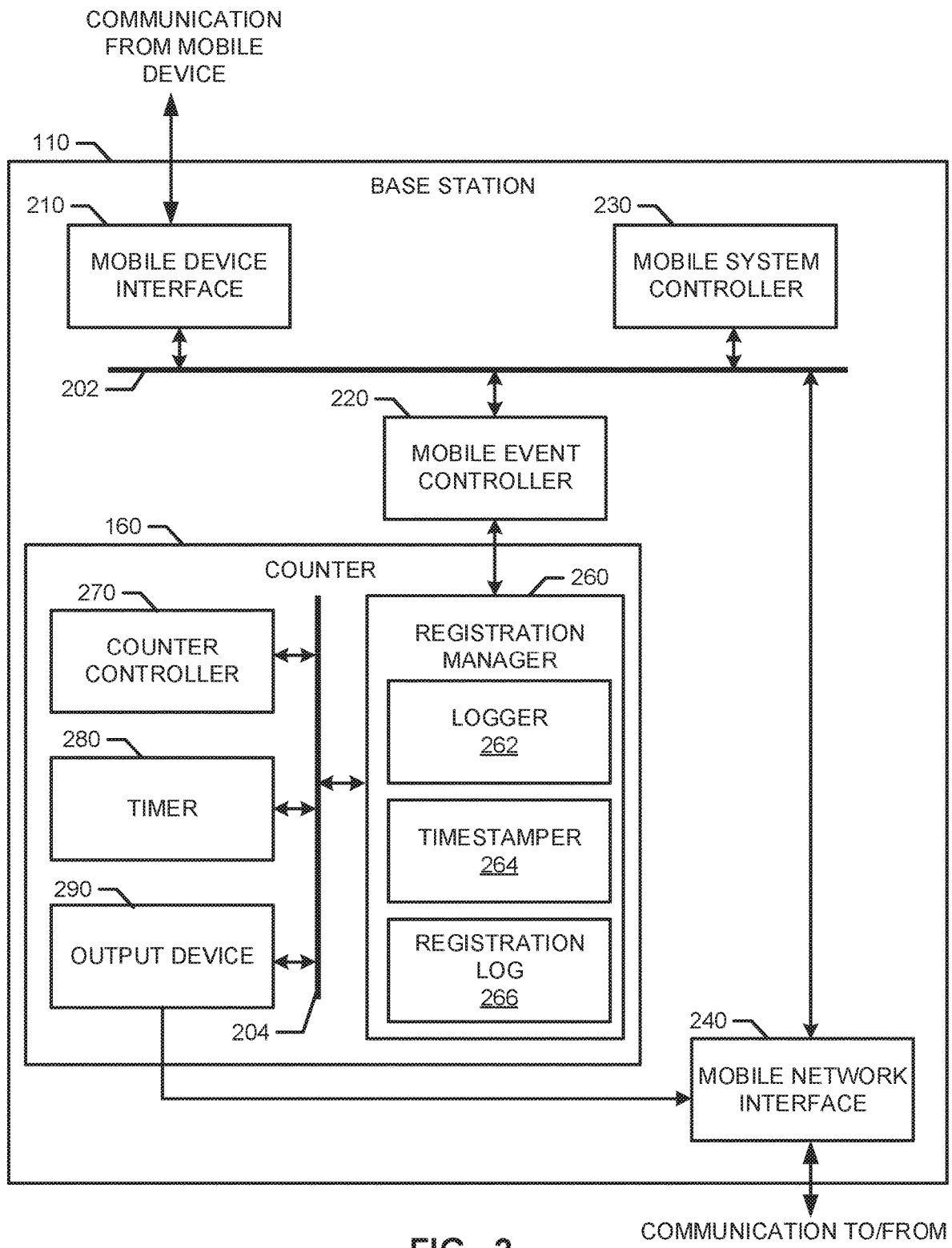
FIG. 2 is a block diagram of a first example implementation of the example base station of FIG. 1 including an example counter disclosed herein.

FIG. 2 is a block diagram of a first example implementation of the example base station 110 of FIG. 1. The example base station 110 of FIG. 2 illustrates an example implementation of the example counter 160 of FIG. 1, an example mobile device interface 210, an example mobile event controller 220, an example mobile system controller 230, and an example mobile network interface 240. An example communication bus 202 facilitates communication between the mobile interface 210, the mobile event controller 220, the mobile system controller 230, and/or the mobile network interface 240. In the illustrated example of FIG. 2, the base station 110 is an active base station capable of providing communication service (e.g., cellular communication, data communication, etc.) to a network (e.g., the network 130) managed by a service provider (e.g., a cellular service provider, an Internet service provider, etc.). For example, the base station 110 may be a femtocell, a microcell, a router, etc. associated with the service provider.

In the example of FIG. 2, the example base station 110 communicates with the mobile device(s) 120 of FIG. 1 via the mobile device interface 210. The example mobile event controller 220 monitors and/or identifies communication between the mobile device(s) 120 and the base station 110. The example mobile system controller 230 monitors communication between requesting mobile device(s) 120 and the network 130. In the illustrated example, the mobile system controller 230 determines whether to facilitate communication between the mobile device(s) 120 and the network 130. For example, the mobile system controller 230 determines whether the mobile device(s) 120 seeking to communicate subscribes to a service provider (e.g., Verizon, AT&T, Sprint, etc.) that owns, leases, and/or operates the network 130. In the illustrated example, if the mobile device 120 is a subscriber to the service provider, then access to the network 130 is granted (e.g., communication is permitted (e.g., not blocked)). In such an example, the mobile system controller 230 facilitates communication between the authorized mobile device(s) 120 and the network 130 via the mobile device interface 210 and the network interface 240 using any past, present, and/or future protocols and/or techniques. The mobile system controller 230 of the illustrated example authorizes and/or determines if the mobile device(s) 120 are authorized subscribers and/or users using any appropriate techniques. When the mobile system controller 230 determines that the base station 110 is to facilitate communication between the mobile device(s) 120 and the network 130, the mobile system controller 230 authorizes the mobile network interface 240 to transmit and/or receive communications for the authorized mobile device(s) 120 to and/or from the network 130.

As mentioned above, the example mobile event controller 220 of FIG. 2 monitors communication between the base station 110 and the mobile device(s) 120. The example mobile event controller 220 of FIG. 2 provides communication information to the counter 160. As disclosed herein, the example communication information may include, for example, a device identifier (device ID) (e.g., an International Mobile Subscriber Identity (IMSI), a device telephone number, a device name, a device address (e.g., internet protocol (IP) address, Media Access Control (MAC) address, etc.), an International Mobile Station Equipment Identity (IMEI) number etc.), and/or signal metrics (e.g., signal strength, signal direction (e.g., to/from the mobile station 110)).

The example counter 160 of FIG. 2 includes an example registration manager 260, an example counter controller 270, an example timer 280, and an example output device 290. An example communication bus 204 facilitates communication between the example registration manager 260, the example counter controller 270, the example timer 280, and/or the example output device 290. The example registration manager 260 of FIG. 2 includes an example logger 262, an example timestamper 264, and an example registration log 266. The registration manager 260 of the illustrated example monitors communication between the mobile device(s) 120 and the base station 110 via the mobile event controller 220. The example logger 262 updates the registration log 266 upon identification of a communication with a mobile device 120, such as the mobile device 120(*a*). The example logger 262 updates the registration log 266 with communication information (e.g., a device ID, signal metrics, etc.). The example timestamper 264 timestamps the communication log to enable identification of what device(s) were present at what times.

In some examples, when the event controller 220 determines that a communication event occurred between a mobile device (e.g., the mobile device 120(*a*)) and the base station 110, the event controller 220 extracts communication information from a message of the communication event. The example event controller 220 forwards the extracted communication information to the registration manager 260. The example registration manager 260 retrieves an identifier from the message (e.g., an IMSI, a phone number, an IP address, a MAC address, etc.) corresponding to the mobile device (e.g., the mobile device 120(*a*)) in communication with the base station 110. If a log entry in the registration log 266 corresponding to the identified mobile device 120 exists in the registration log 266, the communication information in the log entry corresponding to the mobile device 120 is updated. If a log entry in the registration log 266 corresponding to the identified mobile device 120 does not exist, the registration manager 260 creates a log entry in the registration log 266 and stores the communication information (e.g., a request to register, a device identifier, a timestamp, and/or signal strength) in a new log entry of the registration log 266. An example registration log 266 is described in more detail below in connection with FIG. 4. In some examples, the registration log 266 is not organized as explained above, but instead each communication generates a new log entry without reference to existing entries.

The example counter controller 270 of FIG. 2 periodically or aperiodically accesses the collected information to determine a number (n) of mobile device(s) 120 in communication with the base station 110 at particular points and/or periods in time In some examples, the counter controller 270 does not access the collected data but instead exports the data to an external device on a period or aperiodic basis. In some examples, a system administrator or user may request the base station 110 to provide communication information currently stored in the registration log 266 (e.g., a request to indicate the number (n) of mobile device(s) 120 currently in communication with the base station 110). In some such examples, the mobile system controller 230 and/or event controller 220 respond(s) to such a request by requesting the counter controller 270 to provide such information. In some such examples, the counter controller 270 identifies the amount of open log entries (see FIG. 4) indicating current communication with the mobile device(s) 120 and provides data representative of the number (n) of mobile device(s) 120 to the mobile system controller 230 via the output device 290 and/or the mobile network interface 240. Furthermore, in some such examples, the counter controller 270 outputs the data from the log entries of the registration log 266 via the output device 290 to the mobile network interface 240. In some examples, the mobile system controller 230 facilitates transmission of the information to a requesting system administrator or user via the mobile device interface 210 or the mobile network interface 240.

The registration manager 260 of the illustrated example uses the timer 280 to determine when communication between the base station 110 and the mobile device(s) 120 associated with device IDs stored in the registration log 266 has ended (e.g., after a communication timeout involving a threshold period of time passing without communication from the mobile device(s) 120, etc.). In some examples, the counter controller 270 of FIG. 2 instructs the output device 290 to output the corresponding communication data (e.g., device ID, time period of communication, signal metrics, etc.) from the registration log 266 to the mobile network interface 240 for transmission to the central data facility 140 when the timer 280 identifies an end of the communication session. In some examples, the counter controller 270 determines that the corresponding data is to temporarily remain in the registration log 266 (e.g., in the event of a communication failure with the mobile system network 130 and/or in systems that periodically or aperiodically export their data (e.g., once per hour, during time of resource usage, etc.).

While an example manner of implementing the base station 110 of FIG. 1 is illustrated in FIG. 2, one or more of the elements, processes and/or devices illustrated in FIG. 2 may be combined, divided, re-arranged, omitted, eliminated and/or implemented in any other way. Further, the example mobile device interface 210, the example mobile event controller 220, the example mobile system controller 230, the example mobile network interface 240, the example counter 160, the example media detector 152, the example registration manager 260, the example logger 262, the example timestamper 264, the example registration log 266, the example counter controller 270, the example timer 280, the example output device 290 and/or, more generally, the example base station 110 of FIGS. 1 and/or 2 may be implemented by hardware, software, firmware and/or any combination of hardware, software and/or firmware. Thus, for example, any of the example mobile device interface 210, the example mobile event controller 220, the example mobile system controller 230, the example mobile network interface 240, the example counter 160, the example media detector 152, the example registration manager 260, the example logger 262, the example timestamper 264, the example registration log 266, the example counter controller 270, the example timer 280, the example output device 290 and/or, more generally, the example base station 110 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example mobile device interface 210, the example mobile event controller 220, the example mobile system controller 230, the example mobile network interface 240, the example counter 160, the example media detector 152, the example registration manager 260, the example logger 262, the example timestamper 264, the example registration log 266, the example counter controller 270, the example timer 280, the example output device 290, and/or the example base station 110 are hereby expressly defined to include a tangible computer readable storage device or storage disc such as a memory, DVD, CD, Blu-ray, etc. storing the software and/or firmware. Further still, the example base station 110 of FIG. 1 may include one or more elements, processes and/or devices in addition to, or instead of, those illustrated in FIG. 2, and/or may include more than one of any or all of the illustrated elements, processes and devices.

Figure 3:
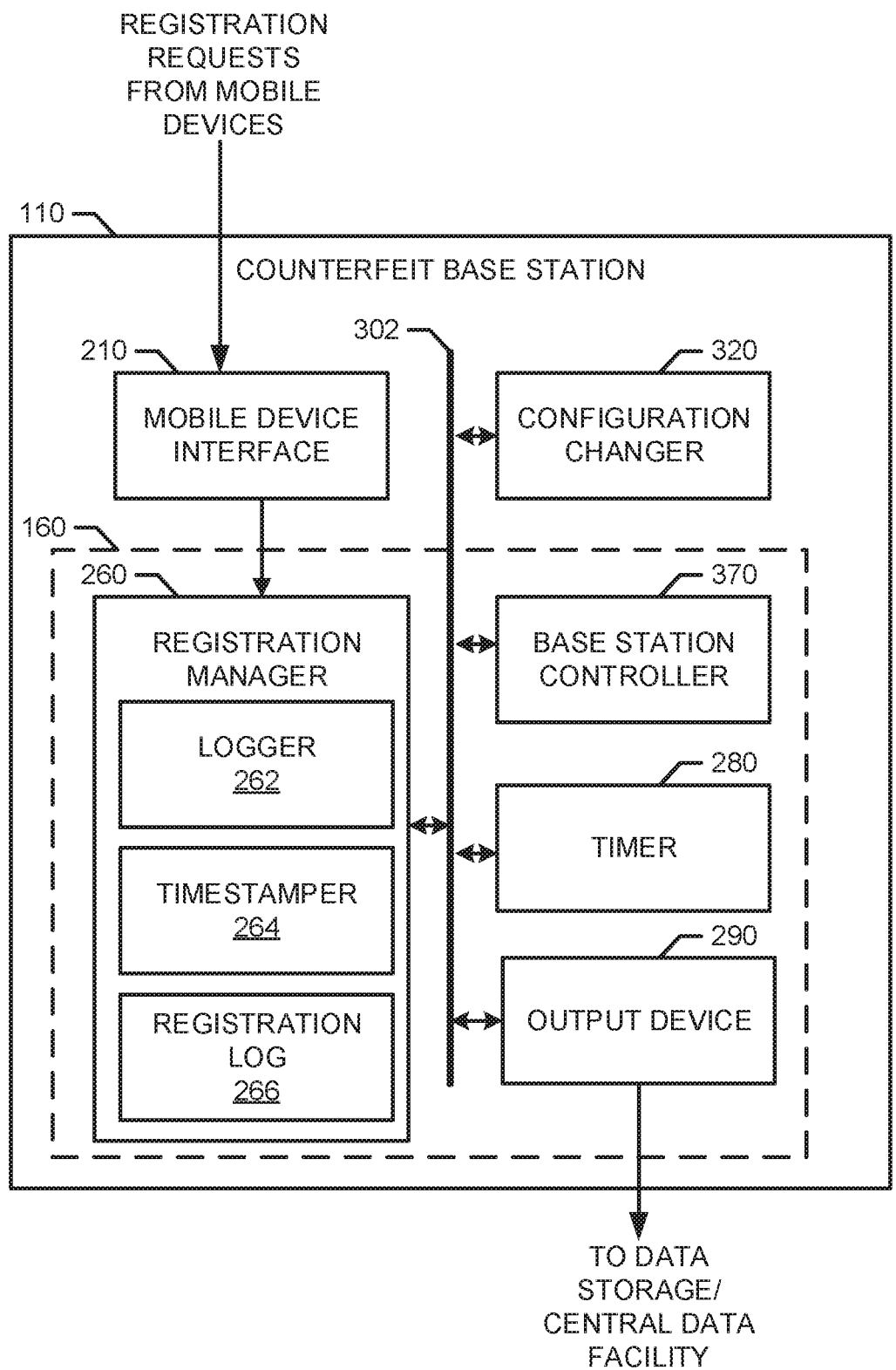
FIG. 3 is a block diagram of a second example implementation of the example base station of FIG. 1.

FIG. 3 is a block diagram of a second example implementation of the example base station 110 of FIG. 1. The example base station 110 of FIG. 3 includes several components that are similar or identical to the components of the example base station of FIG. 2. Thus, the description of these components will not be repeated here. Instead, like components will be identified with like reference numbers to enable the interested reader to refer to FIG. 2 and its description for a full and complete description of these like components. The example base station 110 of FIG. 3 is a counterfeit base station 110 in that it does not actually provide communication services to mobile device(s) 120 but exists instead for people counting purposes. The counterfeit base station 110 of the illustrated example includes an example mobile interface 210, an example configuration changer 320, and an example counter 160 including: (1) an example registration manager 260 (which may be implemented by the example registration manager 260 of FIG. 2), (2) an example base station controller 370, (3) an example timer 280, and (4) an example output device 290. An example communication bus 302 facilitates communication between the registration manager 260, the configuration changer 320, the base station controller 370, the timer 280, and/or the output device 290.

In the illustrated example of FIG. 3, the counterfeit base station 110 is not an active base station (as opposed to the example base station 110 of FIG. 2, which is an active base station). Accordingly, mobile device(s) 120 are not capable of receiving services from (e.g., telephone communication, data communication, etc.) and/or communicating with the network 130 of FIG. 1 via the counterfeit base station 110 because the counterfeit base station 110 is not associated with a service provider. However, in the illustrated example of FIG. 3, the counterfeit base station 110 "acts" like an active base station, and, thus, sends and/or receives signals via a wireless communication protocol (e.g., GSM, CDMA, Wi-Fi, etc.).

In the illustrated example, the counterfeit base station 110 of FIG. 3 "acts" like a cellular femtocell by transmitting signals over one or more unlicensed and/or licensed frequencies of the cellular communication spectrum. In such an example, the mobile device(s) 120 attempt to register with the counterfeit base station 110 because it appears to be an active base station. In some examples, the mobile stations 120 attempt to register with the counterfeit base station 110 in order to gain access to the network 130. In some such examples, after an initial attempt to register with the counterfeit base station 110 to gain access to the network 130 proves to be unsuccessful, the mobile device(s) 120 may no longer attempt to register with the counterfeit base station 110 unless configuration settings of the counterfeit base station 110 are changed. For example, the mobile device(s) 120 may "learn" that registration with the counterfeit base station 110 having a first configuration will not grant access to the network 130, and therefore, future attempts to register with the counterfeit base station 110 are squelched to avoid waste of resources (e.g., battery life, processing bandwidth, etc.). As explained below, the example counterfeit base station 110 of FIG. 3 reconfigures itself to "trick" the mobile device(s) 120 into attempting to register again using the configuration changer 320.

In the example of FIG. 3, the example counterfeit base station 110 receives registration requests from the mobile device(s) 120 of FIG. 1 via the example mobile interface 210. The mobile interface 210 of FIG. 3 forwards communication information extracted from the registration requests to the registration manager 260. The example registration manager 260 of FIG. 3 includes an example logger 262 (which may be implemented like the example logger 262 of FIG. 2), an example timestamper 264 (which may be implemented like the example timestamper 264 of FIG. 2), and an example registration log 266 (which may be implemented like the example registration log 266 of FIG. 2). The logger 262 of the registration manager 260 monitors communications between the mobile device(s) 120 and the base station 110 and recording information in the registration log 266 similar to the registration manager 260 as described above in connection with FIG. 2.

The example base station controller 370 of FIG. 3 provides communication information corresponding to the number of mobile device(s) 120 that have been and/or are currently in communication with the counterfeit base station 110. The base station controller 370 operates similarly to the counter controller 270 disclosed above in connection with FIG. 2. In some examples, the base station controller 370 of FIG. 3 monitors a length of time between reconfigurations of the counterfeit base station 110 using the timer 280.

The example base station controller 370 of FIG. 3 instructs the configuration changer 320 to alter the configuration of the counterfeit base station 110 after a threshold period of time. In some examples, the example base station controller 370 instructs the configuration changer 320 to alter the configuration of the counterfeit base station 110 after a threshold number of received registration request(s) (e.g., 1 request, 5 requests, 10 requests, etc.).

The example configuration changer 320 alters the configuration of the counterfeit base station 110 to "trick" the mobile device(s) 120 into attempting to register with the counterfeit base station 110 (even if previous attempts to register failed). The example configuration changer 320 may alter the configuration of the base station 110 by performing the following: (1) changing an identifier (e.g., a base station ID, a service set identifier (SSID), etc.) of the counterfeit base station 110 (the identifier may be broadcast across a licensed or unlicensed wireless spectrum), (2) changing a signal strength of signals broadcasts by the counterfeit base station 110, and/or (3) initiating or performing a system restart of the counterfeit base station 110. Other techniques that may alter the appearance of the counterfeit base station 110 relative to the mobile device(s) 120 may be implemented by the configuration changer 320.

The example timer 280 and the example output device 290 of FIG. 3 are respectively implemented similarly to the timer 280 and output device 290 disclosed above in connection with FIG. 2. In the example of FIG. 3, the example output device 290 outputs received data from the registration manager 260 to a data storage device associated with the counterfeit base station 110 (e.g., the mass storage device 928 of FIG. 9), a network (e.g., the network 130 of FIG. 1), and/or a central data facility (e.g., the central data facility 140 of FIG. 1).

While an example manner of implementing the example counterfeit base station 110 is illustrated in FIG. 3, one or more of the elements, processes and/or devices illustrated in FIG. 3 may be combined, divided, re-arranged, omitted, eliminated and/or implemented in any other way. Further, the example mobile device interface 210, the example registration manager 260, the example logger 262, the example timestamper 264, the example registration log 266, the example configuration changer 320, the example base station controller 370, the example timer 280, the example output device 290 and/or, more generally, the example counterfeit base station 110 of FIGS. 1 and/or 3 may be implemented by hardware, software, firmware and/or any combination of hardware, software and/or firmware. Thus, for example, any of the example mobile device interface 210, the example registration manager 260, the example logger 262, the example timestamper 264, the example registration log 266, the example configuration changer 320, the example base station controller 370, the example timer 280, the example output device 290 and/or, more generally, the example counterfeit base station 110 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example mobile device interface 210, the example registration manager 260, the example logger 262, the example timestamper 264, the example registration log 266, the example configuration changer 320, the example base station controller 370, the example timer 280, the example output device 290, and/or the example counterfeit base station 110 are hereby expressly defined to include a tangible computer readable storage device or storage disc such as a memory, DVD, CD, Blu-ray, etc. storing the software and/or firmware. Further still, the example counterfeit base station 110 of FIG. 3 may include one or more elements, processes and/or devices in addition to, or instead of, those illustrated in FIG. 3, and/or may include more than one of any or all of the illustrated elements, processes and devices.

Figure 4:
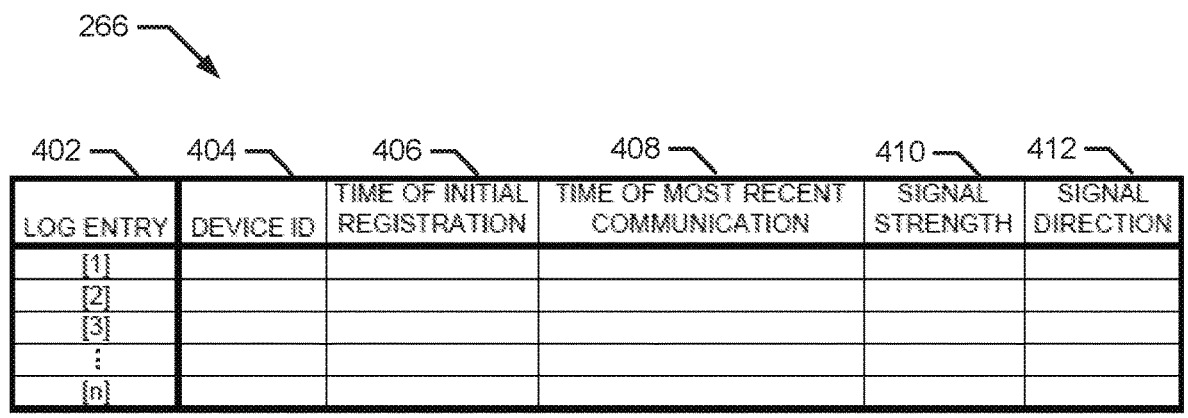
FIG. 4 is an example data structure of an example registration log that may be implemented by the example base station of FIGS. 1, 2, and/or 3.

FIG. 4 is an example data structure of an example registration log 266 that may be implemented by the example base station and/or counterfeit base station 110 of FIGS. 1, 2, and/or 3. The example registration log 266 includes (n) log entries 402 (which may correspond to the number (n) of mobile device(s) 120 in FIG. 1), designated by the rows of the registration log 266. Each of the example log entries 402 (e.g., each row of the example table 266) corresponds to a respective one of the mobile device(s) 120 in communication with (or being tracked by) the base station 110.

Each log entry 402 of FIG. 4 includes a device ID field 404, a time of initial registration field 406, a time of most recent communication field 408, a signal strength field 410, and a signal direction field 412. The example device ID field 404 is used to store a device ID (e.g., an IMSI, a telephone number, a MAC address, an IP address, etc.) corresponding to the mobile device 120. The example time of initial registration field 406 is used to store timing information (from the timestamper 264) corresponding to when the mobile devices initially register with the base station 110. The time of most recent communication field 408 is used to store timing information (from the timestamper 264) corresponding to a most recently determined time that the mobile device(s) 120 communicated with the base station 110. The signal strength field 410 is used to store information corresponding to a measured signal strength of the communication when either the initial registration request was made or when the most recent communication occurred. The signal direction field 412 is used to store information corresponding to an identified communication direction (e.g., to or from the mobile) and/or a type of communication (e.g., registration request, acknowledgment message, etc.).

Figure 5:
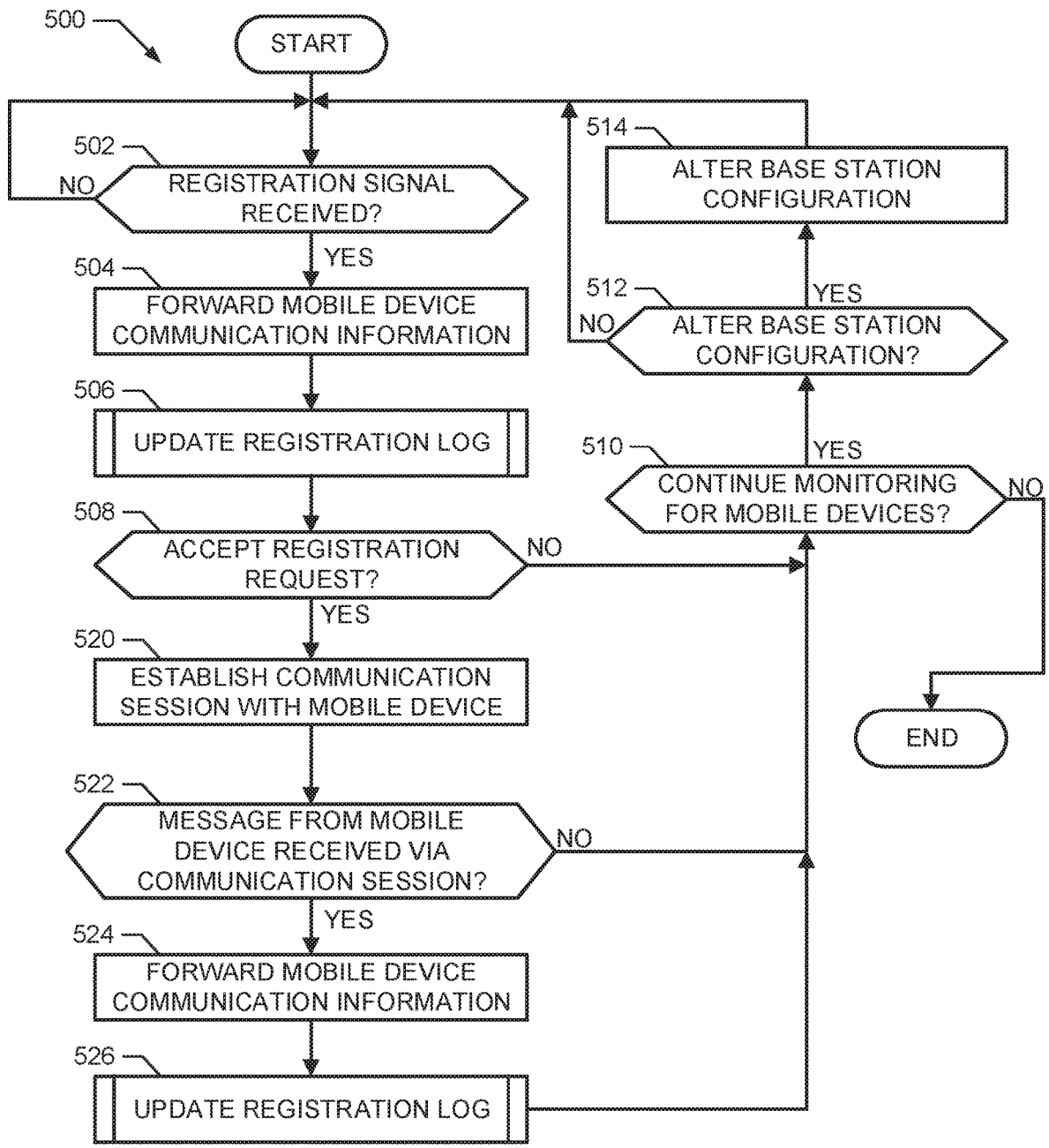
FIG. 5 is a flowchart representation of example machine readable instructions that may be executed to implement the example base station and/or the example counterfeit base station of FIGS. 1, 2 and/or 3.
Figure 6:
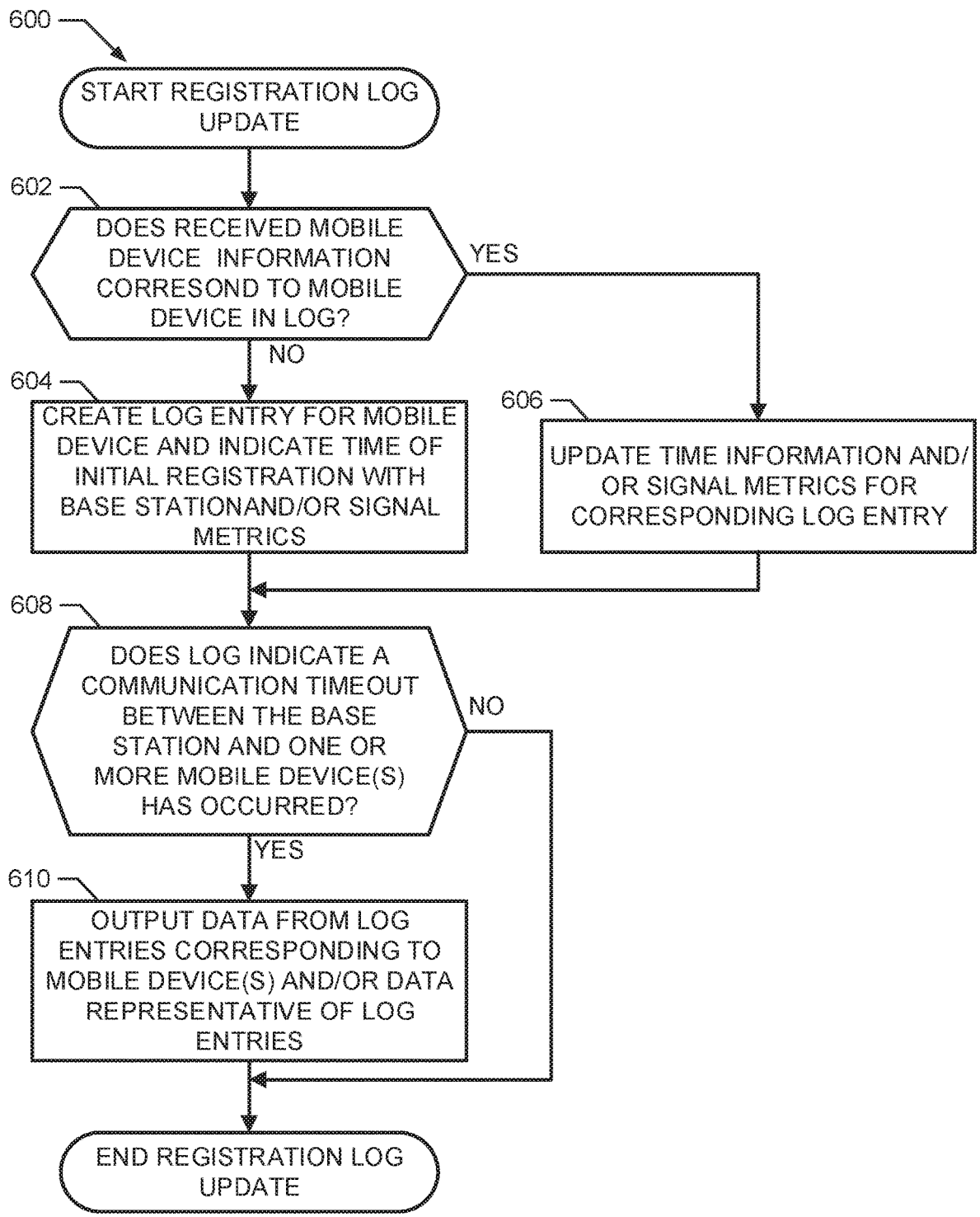
FIG. 6 is a flowchart representation of example machine readable instructions that may be executed to implement an example registration manager of the example base station of FIGS. 1, 2, and/or 3.

A flowchart representative of example machine readable instructions for implementing the base station and/or counterfeit base station 110 of FIGS. 1, 2, and/or 3 is shown in FIG. 5. A flowchart representative of example machine readable instructions for implementing the registration manager 260 of FIGS. 1, 2, and/or 3 is shown in FIG. 6. In this example, the machine readable instructions comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 5 and/or 6, many other methods of implementing the example base station 110 of FIG. 2 and/or the example counterfeit base station 110 of FIG. 3 may alternatively be used. For example, the order of execution of the blocks may be changed, and/or some of the blocks described may be changed, eliminated, or combined.

The program 500 of FIG. 5 begins with an initiation of the example base station or counterfeit base station 110 (e.g., power up, start up, etc.) to facilitate communication with the example mobile device(s) 120 of FIG. 1. The example program 500 represents is iterative. As such, multiple instances of the program 500 (e.g., multiple threads) may exist and/or execute in parallel simultaneously or substantially simultaneously.

At block 502 of FIG. 5, the event controller 220 of FIG. 2 and/or the mobile interface 210 of FIG. 3 determines whether a request for registration signal (e.g., a request for registration message) is received from a mobile device (e.g., the mobile device 120(a)). If no registration signal is received by the mobile device interface 210 of FIGS. 2 and/or 3, control loops back to continue monitoring for received registration signals at block 502. If a registration signal is received, for example, from the mobile device 120(a), control advances to block 504. At block 504, the event controller 220 of FIG. 2 and/or the mobile interface 210 of FIG. 3 extracts and/or forwards mobile device communication information, such as the device ID (e.g., the IMSI, MAC address, etc.) of the mobile device 120(a) and signal metrics (e.g., signal strength, signal direction, message type etc.) of the communication to the registration manager 260.

At block 506 of FIG. 5, the registration manager 260 updates the registration log 266 of FIGS. 2, 3 and/or 4 to include the recent communication with the mobile device 120(a).

Following the update to the registration log 266 in block 506, at block 508, the example mobile system controller 230 of FIG. 2 determines whether to accept the registration request from the mobile device 120(a). In some examples, the mobile system controller 230 accepts the registration request if the mobile device 120(a) is a subscriber of a service provider associated with the mobile base station 110. In some examples, the mobile system controller 230 denies the registration request if the mobile device 120(a) is not a subscriber of an associated service provider, if the base station 110 does not have available bandwidth to facilitate communication to/from the mobile device 120(a), etc. At block 508, if the mobile system controller 230 denies the registration request from the mobile device 120(a), control advances to block 510. At block 508, if the mobile system controller 230 accepts the registration request from the mobile device 120(a), control advances to block 520.

For the counterfeit base station 110 of FIG. 3, the registration is not accepted at block 508 because the counterfeit base station 110 does not accept registration requests. Accordingly, the base station controller 370 of FIG. 3 advances control to block 510 (i.e., never branches to block 520).

At block 510 of FIG. 5, the mobile system controller 230 of FIG. 2 and/or the base station controller 370 of FIG. 3 determines whether or not to continue monitoring communication with the mobile device(s) 120. If the mobile system controller 230 of FIG. 2 and/or the base station controller 370 of FIG. 3 determine(s) that the base station and/or the counterfeit base station 110 is to no longer monitor communication with the mobile device(s) 120 (e.g., due to a system failure, due to a system shutdown, due to a power failure, etc.), the program 500 ends. If the mobile system controller 230 of FIG. 2 and/or the base station controller 370 of FIG. 3 determines that the base station and/or the counterfeit base station 110 is to continue monitoring communication with the mobile device(s) 120, control advances to block 512.

In the illustrated example of FIG. 5, at block 512, the mobile system controller 230 of FIG. 2 and/or the configuration changer 320 of FIG. 3 determine(s) whether to alter the configuration of the base station and/or the counterfeit base station 110. In some examples, at block 512 the mobile system controller 230 of FIG. 2 and/or the configuration changer 320 of FIG. 3 alter(s) the base station configuration after a threshold period of time (e.g., 10 minutes, 30 minutes, etc.) has passed without communication from one or more of the mobile device(s) 120 and/or a registration request from the mobile device(s) 120. In some examples, for an actual base station 110, the mobile system controller 230 of FIG. 2 only alters the base station configuration due to a power failure, system shutdown, system failure, a reprogramming event, etc. If the mobile system controller 230 and/or the configuration changer 320 determine(s) not to alter the configuration of the base station and/or the counterfeit base station 110, control returns to block 502. If the mobile system controller 230 and/or the configuration changer 320 determine(s) to alter the base station configuration, control advances to block 514.

At block 514, the mobile system controller 230 of FIG. 2 and/or the configuration changer 320 of FIG. 3 alter(s) one or more configuration(s) of the base station and/or the counterfeit base station 110. In some examples, the mobile system controller 230 and/or the configuration changer 320 alter(s) the configuration of the base station and/or the counterfeit base station 110 by changing an identifier of the base station and/or the counterfeit base station 110. In some examples, the mobile system controller 230 and/or the configuration changer 320 alter(s) the configuration of the base station and/or the counterfeit base station 110 by changing a radio signal strength of the base station and/or the counterfeit base station 110. In some examples, the mobile system controller 230 and/or the configuration changer 320 alter(s) the configuration of the base station and/or the counterfeit base station 110 by shutting down and restarting the mobile base station and/or the counterfeit base station 110 after a threshold period of time and/or by resetting the mobile base station and/or the counterfeit base station 110. The mobile system controller 230 and/or the configuration changer 320 may alter the configuration of the base station and/or the counterfeit base station 110 using any appropriate techniques. Such example alterations to the configuration(s) of the base station and/or the counterfeit base station 110 may cause, trigger, trick, manipulate and/or entice the example mobile device(s) 120 of FIG. 1 to send and/or resend registration requests to the base station and/or the counterfeit base station 110. For example, for the base station 110 of FIG. 2, altering the base station configuration may cause the mobile device(s) 120 that is/are not subscribed to the network 130 to attempt to reregister with the base station 110 despite previously experiencing one or more failed attempts to register with the base station 110.

Returning back to block 520, when the mobile system controller 230 of FIG. 2 accepts the registration request from the mobile device 120(*a*) (block 508), the mobile system controller 230 establishes a communication session with the mobile device 120(*a*) (e.g., by sending an acknowledgement message) via the mobile device interface 210. The example mobile system controller 230 and/or the example mobile device interface 210 may communicate with the example mobile device 120(*a*) using any appropriate techniques (e.g., GSM, CDMA, Wi-Fi, etc.).

At block 522 of FIG. 5, the event controller 220 of FIG. 2 determines whether the mobile device 120(*a*) and the base station 110 have communicated. In some examples, at block 522, the event controller 220 monitors a length of time from establishing the communication session (at block 520) (e.g., from a time an acknowledgement message was sent from the base station 110). In some such examples, if a message is not received from the mobile device 120(*a*) after a threshold period of time, the event controller 220 determines that the communication session with mobile device 120(*a*) has ended (e.g., the mobile device 120(*a*) has left the area). At block 522, if the event controller 220 determines that a message (e.g., a response message, a data packet, a registration request, etc.) from the mobile device 120(*a*) has not been received, control advances to block 510. In some examples, when the event controller 220 determines that no message has been received, the event controller 220 notifies the registration manager 260 that the communication session has ended, and the registration manager 260 updates the registration log 266 to identify the most recent communication direction (to the mobile device 120(*a*)).

In the illustrated example of FIG. 5, if the event controller 220 determines that a message has been received, control advances to block 524. At block 524, the example event controller 220 forwards mobile device communication information (e.g., device ID, signal metrics, etc.) associated with the message and/or the mobile device 120(*a*) to the example registration manager 260 of the example counter 160 of FIG. 2.

At block 526, the example registration manager 260 updates the registration log 266 to include the received communication information from the event controller 220. In some examples, the example program 600 of FIG. 6 may be executed to implement the example update process of block 526. Following the update at block 526, control advances to block 510 where the mobile system controller 230 determines whether to continue monitoring for communication to or from the mobile device(s) 120 (block 510). If the base station is not to continue monitoring for communication from the mobile device(s) 120, the program 500 ends.

FIG. 6 illustrates an example program 600, which may be used to implement block 506 and/or block 526 of FIG. 5. The example program 600 of FIG. 6 begins when the registration manager 260 receives communication information from the event controller 220 of FIG. 2 and/or the mobile interface 210 of FIG. 3. At block 602, the logger 262 determines whether a log entry (see FIG. 4) corresponding to the mobile device 120(*a*) exists in the registration log 266. If the logger 262 determines that a log entry corresponding to the mobile device 120(*a*) does not exist in the log at block 602, control advances to block 604. At block 604 of FIG. 6, the example logger 262 creates a new log entry (e.g., a log entry [0001] of FIG. 4) for the mobile device 120(*a*) and logs one or more of the device ID, a time of registration (from the timestamper 264), a signal strength measurement of the mobile device 120(*a*) (e.g., received from the event controller 220 of FIG. 2 and/or the mobile interface 210 of FIG. 3), and/or direction/signal type (e.g., to/from the mobile device 120(*a*), registration request type, acknowledgment type, etc.) of the communication.

Returning to block 602 of FIG. 6, if the logger 262 determines that a log entry corresponding to the mobile device 120(*a*) does exist in the registration log 266 (e.g., because a previous registration request was received from the mobile device 120(*a*)), control advances to block 606. At block 606, the example logger 262 updates the time information of the most recent communication via the timestamper 264. In some examples, at block 606, the logger 262 updates the signal metrics in the corresponding log entry to reflect the signal metrics of the present communication (i.e., the most recent communication rather than the initial registration request) between the mobile device 120(*a*) and the base station and/or counterfeit base station 110.

Following block 604 or block 606 of FIG. 6, at block 608, the logger 262 determines whether a communication timeout between the one or more of the mobile device(s) 120 has occurred. In the examples disclosed herein, a communication timeout occurs if a threshold period of time (e.g., 15 minutes, 1 hour, etc.) passes between communication events (e.g., registration signals, acknowledgement signals, etc.) occurring between the mobile device(s) 120 and the base station and/or counterfeit base station 110. Accordingly, at block 608, the logger 262 identifies the time of the most recent communication for each of the log entries 402 corresponding to the mobile device(s) 120. Using information from the timer 280, the logger 262 calculates a length of time since the last communication (i.e., current time−time of most recent communication=length of time since last communication), and if the length of time has exceeded a threshold period of time (e.g., 20 minutes, 30 minutes, etc.), the logger 262 determines that a communication timeout has occurred. If a communication timeout has not occurred, the program 600 ends. If the logger 262 determines that a communication timeout has occurred for one or more of the mobile device(s) 120 corresponding to one or more log entries 402 at block 608, control advances to block 610. At block 610, the logger 262 outputs the data (e.g., the device ID, the time information, signal metrics, etc. of FIG. 4) from the one or more corresponding log entries 402. In some examples, the logger 262 outputs data representative of the number of communication timeouts (e.g., data indicating the number of log entries 402 that timed out). In some examples, the log entries 402 are cleared to maintain capacity for future log entries.

Figure 7:
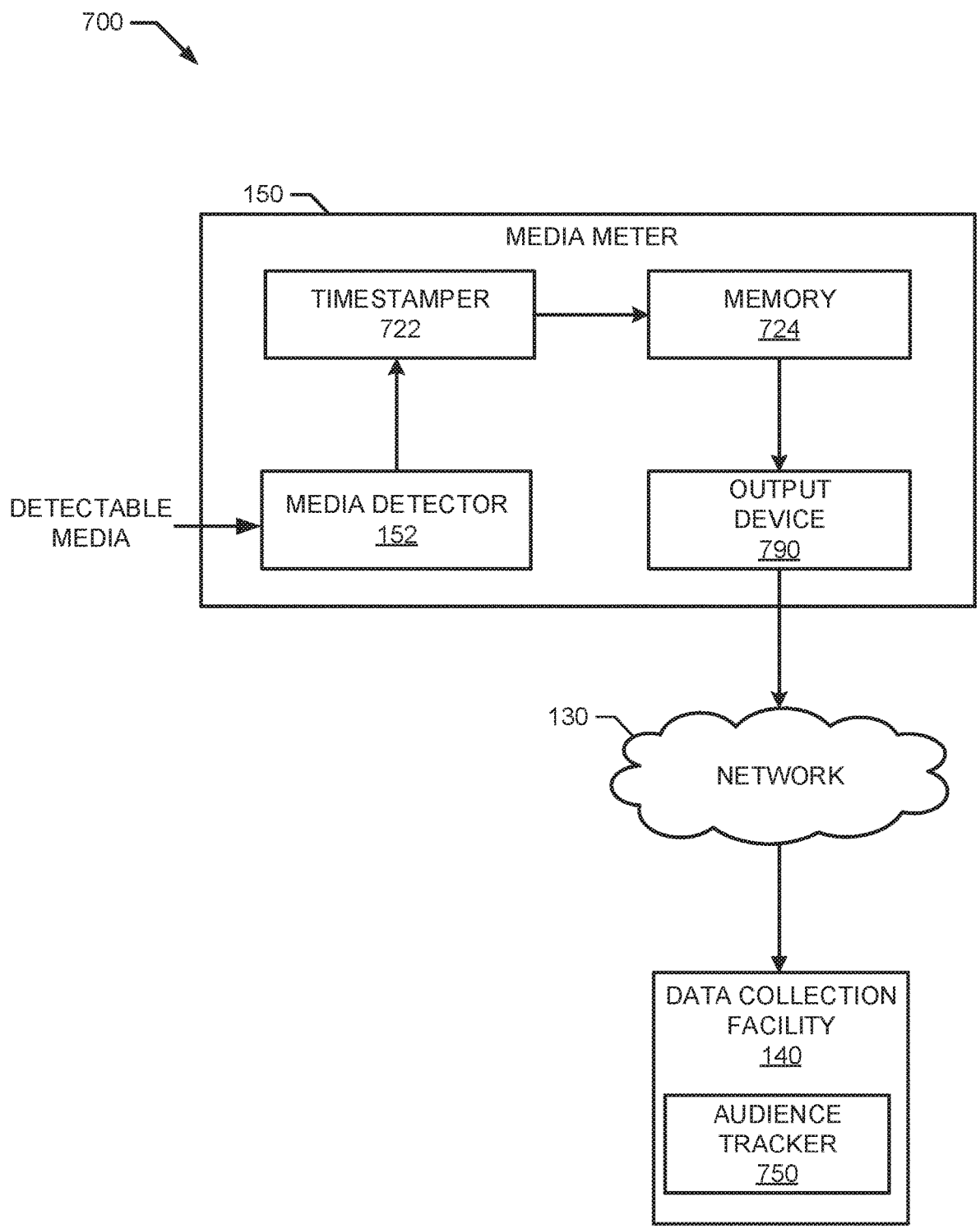
FIG. 7 is a block diagram of an example implementation of the media meter of FIG. 1.

FIG. 7 is a block diagram of an example implementation of the media meter FIG. 1. The example media meter system 700 includes an example network 130 (which may be implemented by the network 130 of FIG. 1) and an example data collection facility 140 (which may be implemented by the data collection facility 140 of FIG. 4) and an example media meter 150. The example media meter 150 of FIG. 7 includes an example media detector 152 (which may be implemented by the media detector 152 of FIG. 1), an example timestamper 722, an example memory 724, and an example output device 790. The example timestamper 722 of the illustrated example may be synchronized with a timestamper (e.g., the timestamper 264 of FIGS. 2 and/or 3) of the base station and/or the counterfeit base station 110.

The example media meter system 700 of FIG. 7 enables a user or an audience measurement entity (e.g. The Nielsen Company) to determine a number of people at a given location (e.g., a location corresponding to the base station and/or counterfeit base station 110) that are exposed to media detected by the media detector 152 using the base station and/or the counterfeit base station 110. In the example of FIG. 7, the example media detector 152 detects presentation(s) of media in a media exposure environment (e.g., a home, a restaurant, etc.) as described above with respect to FIG. 1. The media detector 152 provides the detected media information to the timestamper 722. The timestamper 722 timestamps the detected media information and submits the media information to the memory 724.

Accordingly, the timestamped detected media information may be retrieved from the memory 724 via the network 130 and processed at the data collection facility 140. The example data collection facility 140 of FIG. 7 includes an example audience tracker 750. The audience tracker 750 processes the retrieved media information. Based on timestamps of the retrieved media information, the audience tracker 750 of FIG. 7 may determine a number (n) of mobile device(s) 120, and thus a number of people, that were exposed to the media presentations associated with the media information. In some examples, the audience tracker 750 adjusts the determined number (n) based on a probability that the number (n) of mobile device(s) 120 accurately correspond to the same number of people (N) as detected mobile device(s) 120. For example, using demographics for an expected audience, the number (n) may be adjusted (e.g., by adding, by subtracting, by multiplying, by dividing, etc.) by a probability factor corresponding to the demographics of the expected audience. In some examples, the audience tracker 750 determines granular identity information of the people exposed to the media presentation by accessing a table of demographic information of users (e.g., participating panelists) based on identifiers corresponding to the mobile device(s) 120.

While an example manner of implementing the media meter 150 is illustrated in FIG. 7, one or more of the elements, processes and/or devices illustrated in FIG. 7 may be combined, divided, re-arranged, omitted, eliminated and/or implemented in any other way. Further, the example media detector 152, the example timestamper 722, the example memory 724, the example output device 790 and/or, more generally, the example media meter 150 of FIG. 7 may be implemented by hardware, software, firmware and/or any combination of hardware, software and/or firmware. Thus, for example, any of the example media detector 152, the example timestamper 722, the example memory 724, the example output device 790 and/or, more generally, the example media meter 150 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example media detector 152, the example timestamper 722, the example memory 724, the example output device 790, and/or the example media meter 150 are hereby expressly defined to include a tangible computer readable storage device or storage disc such as a memory, DVD, CD, Blu-ray, etc. storing the software and/or firmware. Further still, the example media meter 150 of FIG. 7 may include one or more elements, processes and/or devices in addition to, or instead of, those illustrated in FIG. 7, and/or may include more than one of any or all of the illustrated elements, processes and devices.

Figure 8:
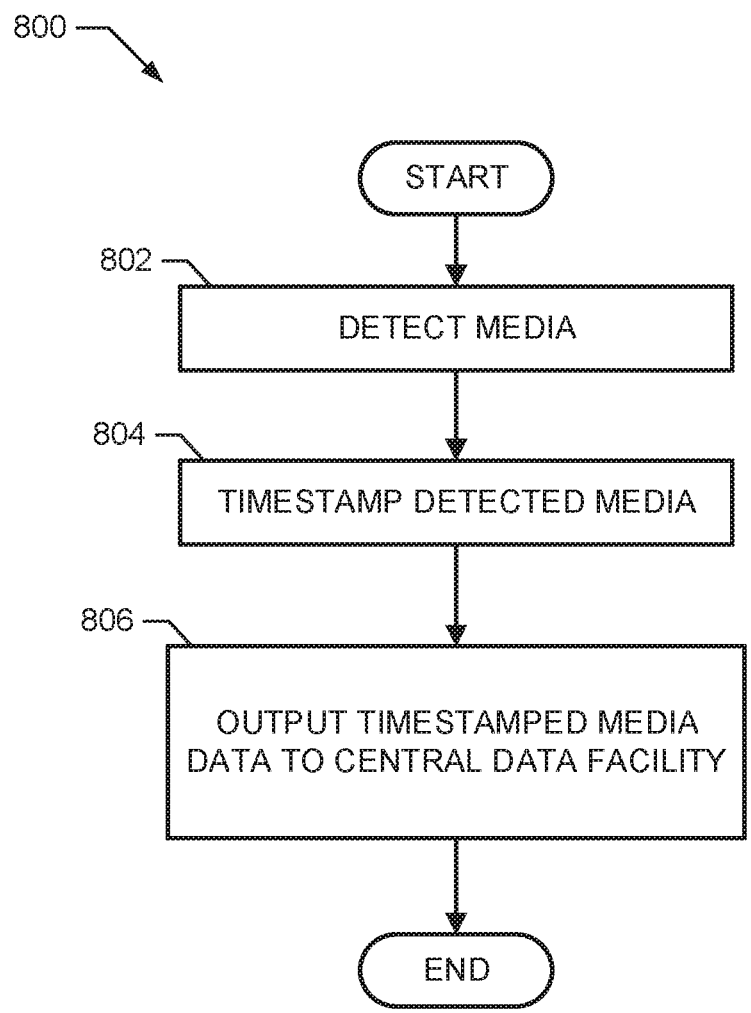
FIG. 8 is a flowchart representation of example machine readable instructions that may be executed to implement the example media meter of FIG. 7.

A flowchart representative of example machine readable instructions for implementing the media meter 150 of FIG. 7 is shown in FIG. 8. In this example, the machine readable instructions comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 8, many other methods of implementing the example media meter 150 may alternatively be used. For example, the order of execution of the blocks may be changed, and/or some of the blocks described may be changed, eliminated, or combined.

The program 800 of FIG. 8 begins with an initiation of the example media meter 150 of FIG. 7 to detect media. At block 802, the example media detector 152 of FIG. 7 detects media being presented (e.g., by collecting watermarks, codes, generating signatures, etc.). At block 804, the example timestamper 722 timestamps media identification data corresponding to the detected media.

At block 806, the timestamped media is output to the central data facility for processing. For example, at the central data facility 140, the timestamped media identification information may be used with people identifying information generated and/or received from a registration manager 250 of the base station and/or the counterfeit base station 110 of FIGS. 2 and/or 3. Accordingly, using the timestamped media identification data and the people meter data from the base station and/or the counterfeit base station 110 information, an audience measurement for the detected media may be calculated. For example, knowing the time period that media was detected by the media detector 152 (at block 802) and the number (n) of mobile devices (e.g., the mobile devices 120 of FIG. 1) in communication with the base station and/or the counterfeit base station 110 during the corresponding time period enables a user or system to calculate and/or estimated size of an audience for the detected media.

The example processes of FIGS. 5, 6, and/or 8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 5, 6, and/or 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disc and to exclude propagating signals. As used herein, when the phrase "at least" is used as the transition term in a preamble of a claim, it is open-ended in the same manner as the term "comprising" is open ended.

Figure 9:
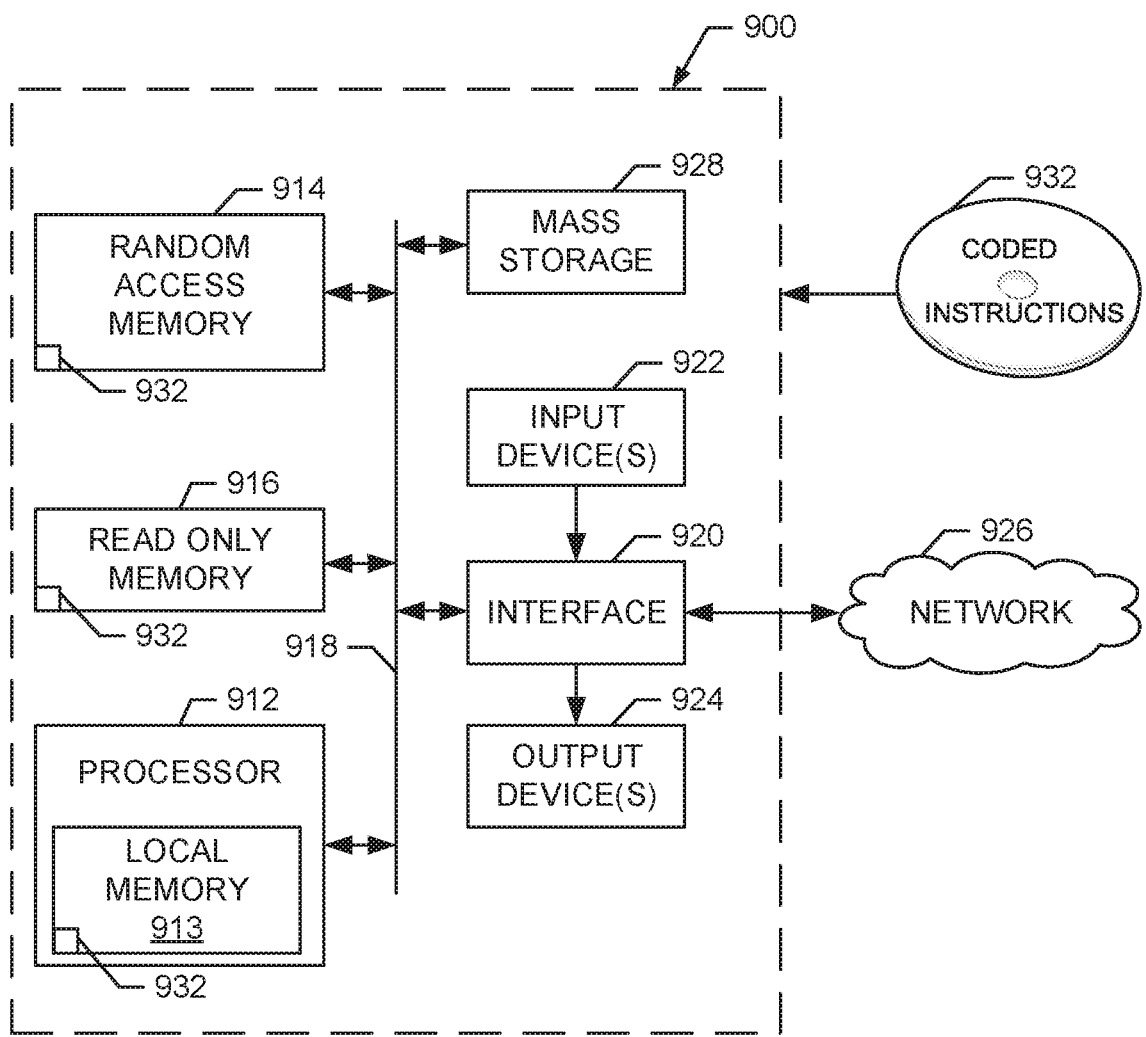
FIG. 9 is a block diagram of an example processing platform capable of executing the example machine readable instructions of FIGS. 5 and/or 6 to implement the example base station of FIGS. 1, 2, and/or 3 and/or to execute the example machine readable instructions of FIG. 8 to implement the example media meter of FIG. 7.

FIG. 9 is a block diagram of an example processor platform 900 capable of executing the instructions of FIGS. 5 and/or 6 to implement the base station and/or the counterfeit base station 110 of FIGS. 1, 2, and/or 3, and/or capable of executing the instructions of FIG. 8 to implement the media meter 150 of FIG. 7. The processor platform 900 can be, for example, a server, a personal computer, a cellular device, a base station device, a router, a wireless access point, a femtocell, a microcell and/or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 920 of the illustrated example, thus, typically includes a graphics driver card.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIGS. 5, 6, and/or 8 may be stored in the mass storage device 928, in the volatile memory 914, in the non-volatile memory 916, and/or on a removable tangible computer readable storage medium such as a CD or DVD.

Example methods, apparatus and articles of manufacture have been disclosed to identify a number of people at a location (and/or exposed to a media presentation) based on a number of mobile devices in communication with a base station (e.g., a femtocell, a microcell, a router, etc.) or a counterfeit base station. The identified number of people may be used in conjunction with a media detector for audience measurement of a media presentation. Thus, above examples may be used to effectively convert a base station for cellular and/or wireless communication into a people meter. Although many of the above examples relate to audience measurement, other uses and/or applications of the disclosed technology are possible. For example, the above disclosed technique may be useful for crowd control by identifying a number of persons in an area, for police or other security work by identifying specific individuals in an area, etc.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A base station comprising:
 a mobile system controller to:
  change a configuration setting of the base station to cause one or more mobile devices registered with the base station to re-register with the base station, the base station to not provide network access to a first one of the one or more mobile devices registered with the base station;
  determine whether a threshold amount of time has elapsed without communication from the first one of the one or more mobile devices that was previously registered with the base station; and
  in response to determining the threshold amount of time has elapsed, change the configuration setting of the base station again to cause the first one of the one or more mobile devices that was previously registered with the base station to re-register with the base station;
 a registration manager to respond to registration requests received from the one or more mobile devices after the configuration setting is changed by storing device identification information for the one or more mobile devices associated with the registration requests; and
 a counter controller to determine a count of mobile devices at a location of the base station based on the stored device identification information, the counter controller to determine the count in response to a request.

2. The base station of claim 1, wherein the configuration setting includes an identifier of the base station.

3. The base station of claim 1, wherein the threshold amount of time is a first threshold amount of time and after the configuration setting is changed, the mobile system controller is further to:
   determine whether a second threshold amount of time has elapsed without receipt of any further registration requests; and
   in response to determining the second threshold amount of time has elapsed, change the configuration setting of the base station again.

4. The base station of claim 1, wherein the one or more mobile devices are a first set of one or more mobile devices, the registration requests are first registration requests, the device identification information is first device identification information, and the registration manager is further to respond to second registration requests from a second set of one or more mobile devices that have not previously sent the first registration requests to the base station by storing second device identification information for the second set of one or more mobile devices.

5. A base station comprising:
   means for changing a configuration setting of the base station to cause one or more mobile devices registered with the base station to re-register with the base station, the base station to not provide network access to a first one of the one or more mobile devices registered with the base station, the means for changing to:
      determine whether a threshold amount of time has elapsed without communication from the first one of the one or more mobile devices that was previously registered with the base station; and
      in response to determining the threshold amount of time has elapsed, change the configuration setting of the base station again to cause the first one of the one or more mobile devices that was previously registered with the base station to re-register with the base station;
   means for responding to registration requests received from the one or more mobile devices after the configuration setting is changed, the means for responding to store device identification information for the one or more mobile devices associated with the registration requests; and
   means for determining a count of mobile devices at a location of the base station based on the stored device identification information, the means for determining to determine the count in response to a request.

6. The base station of claim 5, wherein the configuration setting includes an identifier of the base station.

7. The base station of claim 5, wherein the threshold amount of time is a first threshold amount of time and after the configuration setting is changed, the means for changing the configuration setting is further to:
   determine whether a second threshold amount of time has elapsed without receipt of any further registration requests; and
   in response to determining the second threshold amount of time has elapsed, change the configuration setting of the base station again.

8. A tangible machine readable storage medium comprising instructions that, when executed, cause a processor to at least:
   change a configuration setting of a base station to cause one or more mobile devices registered with the base station to re-register with the base station, the base station to not provide network access to a first one of the one or more mobile devices registered with the base station;
   respond to registration requests received from the one or more mobile devices after the configuration setting is changed by storing device identification information for the one or more mobile devices associated with the registration requests;
   determine whether a threshold amount of time has elapsed without communication from the first one of the one or more mobile devices that was previously registered with the base station;
   in response to a determination that the threshold amount of time has elapsed, change the configuration setting of the base station again to cause the first one of the one or more mobile devices that was previously registered with the base station to re-register with the base station; and
   determine a count of mobile devices at a location of the base station based on the stored device identification information, the count to be determined in response to a request.

9. The tangible machine readable storage medium of claim 8, wherein the configuration setting includes an identifier of the base station.

10. The tangible machine readable storage medium of claim 8, wherein the threshold amount of time is a first threshold amount of time and after the configuration setting is changed, the instructions, when executed, further cause the processor to:
    determine whether a second threshold amount of time has elapsed without receipt of any further registration requests; and
    in response to determining the second threshold amount of time has elapsed, change the configuration setting of the base station again.

11. The tangible machine readable storage medium of claim 8, wherein the instructions, when executed, further cause the processor to adjust the count of the mobile devices at the location to correspond to a number of persons at the location based on a probability of accuracy.

12. The tangible machine readable storage medium of claim 11, wherein the probability of accuracy is a probability that the number of persons at the location is equivalent to the count of the mobile devices identified at the location.

13. The tangible machine readable storage medium of claim 11, wherein the probability of accuracy is based on at least one of the location and a timestamp.

14. A tangible machine readable storage medium comprising instructions that, when executed, cause a processor to at least:
    change a configuration setting of a base station to cause one or more mobile devices registered with the base station to re-register with the base station;
    respond to registration requests received from the one or more mobile devices after the configuration setting is changed by storing device identification information for the one or more mobile devices associated with the registration requests;
    determine a count of mobile devices at a location of the base station based on the stored device identification information; and
    adjust the count of mobile devices at the location to correspond to a number of persons at the location based on a probability of accuracy that 1) increases the number of persons when the location includes children, 2) reduces the number of persons when the location excludes children, and 3) reduces the number of persons when a timestamp is during an evening.

15. The base station of claim 1, wherein the counter controller is to adjust the count based on at least one of: (a) demographics of an expected audience of media, (b) a location of the expected audience of the media, (c) one or more timestamps associated with the stored device identification information, or (d) a type of the media.

16. The base station of claim 5, wherein the means for determining is to adjust the count based on at least one of: (a) demographics of an expected audience of media, (b) a location of the expected audience of the media, (c) one or more timestamps associated with the stored device identification information, or (d) a type of the media.

17. The tangible machine readable storage medium of claim 8, wherein instructions cause the processor to adjust the count based on at least one of:
(a) demographics of an expected audience of media, (b) a location of the expected audience of the media, (c) one or more timestamps associated with the stored device identification information, or (d) a type of the media.

18. The base station of claim 1, wherein the counter controller is to cause the count of mobile devices at the location of the base station to be exported in response to expiration of a timer, the expiration of the timer to indicate that the communication between the base station and the first one of the one or more devices has ended.

19. The base station of claim 5, wherein the means for determining the count is to cause the count of mobile devices at the location of the base station to be exported in response to expiration of a timer, the expiration of the timer to indicate that the communication between the base station and the first one of the one or more mobile devices has ended.

20. The tangible machine readable storage medium of claim 8, wherein instructions cause the processor to cause the count of mobile devices at the location of the base station to be exported in response to expiration of a timer, the expiration of the timer to indicate that the communication between the base station and the first one of the one or more devices has ended.

* * * * *